3,087,944
19-METHYL-19-ACYLOXY STROPHANTHIDIN DERIVATIVES
Martin Rubin, Silver Spring, Md., assignor, by mesne assignments, to Advance Growth Capital Corporation, Chicago, Ill., a corporation of Illinois
No Drawing. Filed Feb. 3, 1959, Ser. No. 790,790
4 Claims. (Cl. 260—397.45)

The instant invention relates to a new type of steroid characterized by a carbon extension at the $C_{10}$ position in the cyclopentanophenathrene nucleus. More particularly this invention relates to the conversion of the 19-methyl-19-hydroxy strophanthidin disclosed in applicant's copending application, S.N. 790,791, filed concurrently herewith, into steroids characterized both by the 19-homo grouping and the 17-ketol side chain of the desoxycorticorticosterone steroids.

The sequence proceeds according to the following structural formula

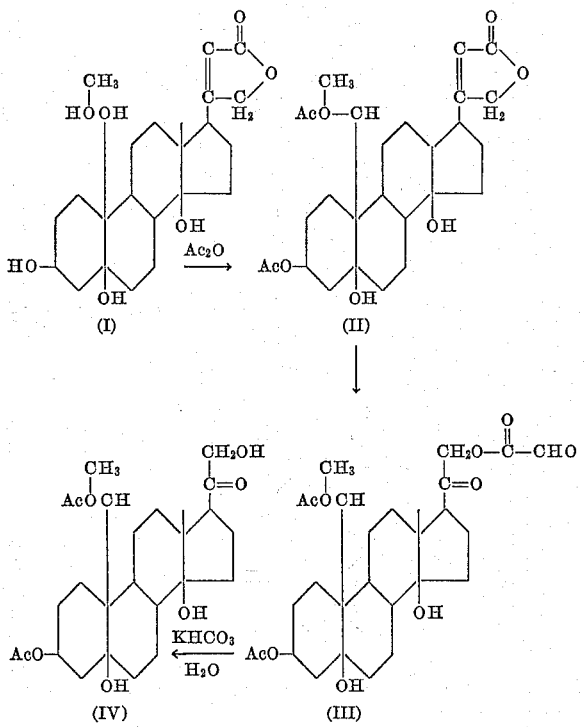

Since formation of the 3,19-acetate is for blocking purposes, in the above sequence other esters may serve equally to prevent side reactions of the 3,19-hydroxy substituents. In particular, the esters of the other lower fatty acids ($C_1$–$C_8$) may be formed at the 3,19 positions, e.g., formate, propionate, butyrate, etc. by correspondingly reacting the anhydride with the strophanthidin derivative of Formula I.

As shown by the above formula sequence, the butenolide lactone at the 17-position is degraded by ozonolysis to a ketol side chain. The reaction proceeds rapidly at the temperatures of about —60° C. to —80° C., when passing ozonated air or oxygen through a solution of steroid II.

After recovery of the degraded product, namely steroid III, mild alkaline hydrolysis, e.g., treatment with aqueous sodium or potassium bicarbonate removes the glyoxyloxy group, resulting in the 3,19-diacetoxy 5,14,21-trioxy 20-keto, 19-methyl-14-isopregnane, the steroid of Formula IV. For subsequent conversions the 21 hydroxy group may be re-esterified with a more stable blocking group, forming preferably the 21-acetate, tri-tylate or tosylate.

More generally the 21-ester may also be a lower acyl group as in the 3,19-acyl esters. In fact ozonolysis of the butenolide (Formula II to III) results in still another contemplated 21 ester as a side product of the reaction because ozonolysis tends also to oxidize the glyoxyloxy group to the oxylyl group, that is to the 21-half ester of oxalic acid. Since the 21-oxylyl derivative is water soluble at alkaline pH washing, the reaction product of ozonolysis with aqueous bicarbonate will extract the oxylyl derivative.

The 19-hydroxy-19-methyl steroids of the instant invention constitute compounds of considerable interest to research chemists as potential pharmaceuticals or as intermediates for preparation of steroid compounds having pharmacological properties. As shown by the formula sequence above, the 19-methyl-19-hydroxy substituents on steroids of the instant invention bear a striking resemblance to the 17 substituent structure found in progesterone and the corticoid steroids. Indeed, as a specific instance of their possible use as intermediates, there is the conversion of compound IV into a progestationally active material set forth in applicant's copending application, S.N. 790,792, filed concurrently herewith.

EXAMPLE I

The crude 19-hydroxy-19-methyl stropthanthidin recovered from the Grignard reaction product of strophanthidin and methyl magnesium iodide (as set forth in copending application S.N. 790,791) was dissolved by gentle warming in 10 ml. of anhydrous pyridine. To the pyridine solution was added 30 ml. of acetic anhydride. After 20 hours at room temperature, 25 ml. of methanol was added. The solvents were then removed in vacuo and the residue taken up in chloroform. The chloroform solution was washed successively with 5% HCl, 10% sodium bicarbonate and several times with distilled water. After drying, the chloroform was evaporated and the residue taken up in 15 ml. of dry benzene and purified by adsorption on 75 g. of neutral alumina. Elution of the chromatographic column with ether-methanol yielded 1.2 g. of 19-methyl strophanthidol-3,19-diacetate, M.P. 130–133° C., $\alpha_D^{25}$ +25.5 (chlf).

Positive legal reaction and the characteristic ultraviolet absorption spectrum showed that the butenolide lactone group was still intact.

Analysis.—Calcd. for $C_{26}H_{40}O_8$: C, 66.55; H, 7.99. Found: C, 66.55; H, 8.40.

EXAMPLE II

Preparation of 3,19-Diacetoxy-21-Glyoxyloxy-5,14-Dioxy-20-Keto, 19-Methyl-14-Isopregnane A solution of 250 mg. of the 19-methyl strophanthidol diacetate, M.P. 130–133° C., product of Example I, in ethyl acetate was ozonized at —80° C. with dry ozonized oxygen introduced for seven minutes at the rate of 150 cc./minute (C=24 mg./liter, 1.82% $O_3$ by weight, ca. 1.1 mmole).

An absorber containing 200 cc. of 2% KI served as a trap for any unreacted ozone. For the first four minutes the ozonized oxygen was completely absorbed in the reaction flask. At the end of seven minutes the ethyl acetate solution was blue and the absorber contained 2 mg. of unreacted ozone as determined by N/40 $Na_2S_2O_3$ titration. After standing at —80° C. for 25 minutes the ethyl acetate was removed at 0° C. in vacuo. The residue dissolved in 5 cc. of cold glacial acetic acid and stirred with zinc dust on a magnetic stiner until KI starch paper was no longer blue on test. The mixture was extracted with two 50 ml. portions of cold chloroform, and the extracts centrifuged from unreacted zinc and zinc acetate. The extraction process was repeated with four 25 ml. portions of chloroform. The combined chloroform extracts were washed once with water, twice with 10% sodium bicarbonate, twice with water and dried over anhydrous sodium sulfate. Removal of the solvent left 200 mg. of crude neutral product which reduced Tollens reagent quickly and strongly.

From the sodium bicarbonate extract on acidification was obtained the corresponding oxylyl derivative which crystallized from ether in fine flat colorless plates, M.P. 285–300° C.

*Analysis.*—Calcd. for $C_{28}H_{40}O_{11}$: C, 60.86; H, 7.24. Found: C, 60.66; H, 7.20.

EXAMPLE III

*3,19-Diacetoxy-5,14,21-Tri-Oxy-20-Keto, 19-Methyl-14-Isopregnane*

200 mg. of the neutral product of Example II in 15 ml. of dry methanol was added to 200 mg. of potassium bicarbonate in 7.5 ml. of water. The solution was shaken for half an hour and allowed to stand at room temperature for 24 hours. Following concentration to 10 ml., the solution was extracted with three 50 ml. portions of chloroform, the extracts washed with water, dried, and concentrated. The residue, 200 mg., crystallized from acetone-petroleum ether giving 125 mg. of colorless crystals, M.P. 100–105° C., $\alpha_D^{25}$ +62.8° (chlf).

*Analysis.*—Calcd. for $C_{26}H_{40}O_8$: C, 65.00; H, 8.33. Found: C, 65.16; H, 8.59.

The ketol reduced Tollens solution readily.

EXAMPLE IV

*3,19,21-Triacetoxy-5,14-Dioxy-20-Keto, 19-Methyl-14-Isopregnane*

The product of Example III, 300 mg., was dissolved in 2 ml. of dry pyridine, and 4 ml. of acetic anhydride added. After standing overnight at room temperature, 10 ml. of methanol was added, the solvents removed in vacuo and the residue dissolved in chloroform. After drying and concentration, the residue was purified by chromatography with benzene over alumina. The fraction diluted with ether yielded 78 mg. of crystals, M.P. 110°–115° C. from a mixed solvent made from equal parts of acetone petroleum ether.

*Analysis.*—Calcd. for $C_{28}H_{42}O_9$: C, 64.36; H, 8.04. Found: C, 64.07; H, 8.06.

EXAMPLE V

*21-Tritoxy-3,19-Diacetoxy-5,14-Dioxy-20-Keto, 19-Methyl-14-Isopregnane*

200 mg. of the ketol product of Example III in 4 ml. of anhydrous pyridine was treated with 200 mg. of triphenyl chloromethane. After one hour on the steam bath the solution stood at room temperature for 24 hours. It was poured into ice and water, extracted with ethyl acetate and the extracts washed with 25 ml. portions of N-hydrochloric acid, 10% sodium bicarbonate and water. After drying with sodium sulfate, the extract was evaporated and the residue purified by chromatography on alumina. Elution with ether-methanol yielded 72 mg. of crystalline 21-trityl derivative, M.P. 135–140° C., $\alpha_D^{25}$ +18.0 (chlf).

*Analysis.*—Calcd. for $C_{45}H_{54}O_8$: C, 74.79; H, 7.48. Found: C, 74.75; H, 7.78.

EXAMPLE VI

*21-Tosyloxy-3,19-Diacetoxy-5,14-Dioxy-20-Keto, 19-Methyl-14-Isopregnane*

To 50 mg. of the ketol of Example III in 2 ml. of pyridine was added 50 mg. of p-toluene sulfonyl chloride. After standing 24 hours at 0° C., 25 ml. of sodium bicarbonate 5% was added and the mixture shaken at 0° C. for 15 minutes. The product was extracted with two 50 ml. portions of chloroform, the extracts washed with 2% hydrochloric acid, water; dried and concentrated. The residue was crystallized from benzene petroleum ether to yield 20 mg. of tosylate, M.P. 160–168° C., $\alpha_D^{25}$ +45.2 (chlf).

*Analysis.*—Calcd. for $C_{32}H_{46}O_{10}S$: C, 61.73; H, 7.39. Found: C, 61.73; H, 7.39.

What is claimed is:

1. A strophanthidin derivative having the formula

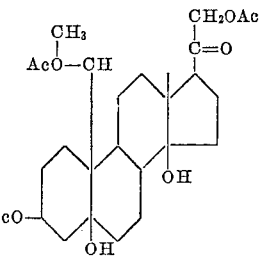

where Ac-O is the acylate of a hydrocarbon carboxylic acid containing from 1–4 carbon atoms.

2. A strophanthidin derivative having the formula

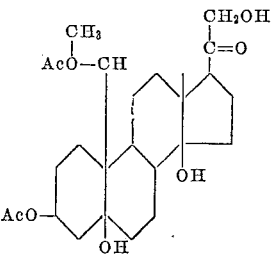

where Ac-O is the acylate of a hydrocarbon carboxylic acid containing from 1–4 carbon atoms.

3. A strophanthidin derivative having the formula

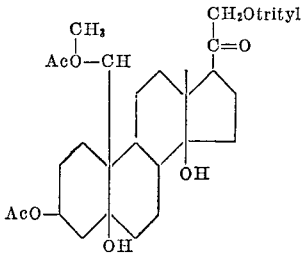

where Ac-O is the acylate of a hydrocarbon carboxylic acid containing from 1–4 carbon atoms.

4. A strophanthidin derivative having the formula

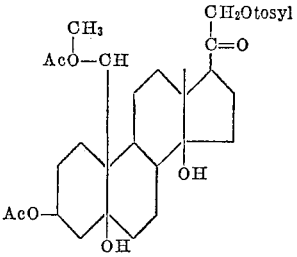

where Ac-O is the acylate of a hydrocarbon carboxylic acid containing from 1–4 carbon atoms.

References Cited in the file of this patent

UNITED STATES PATENTS 2,752,372    Reichstein _____ June 26, 1956